Patented July 16, 1929.

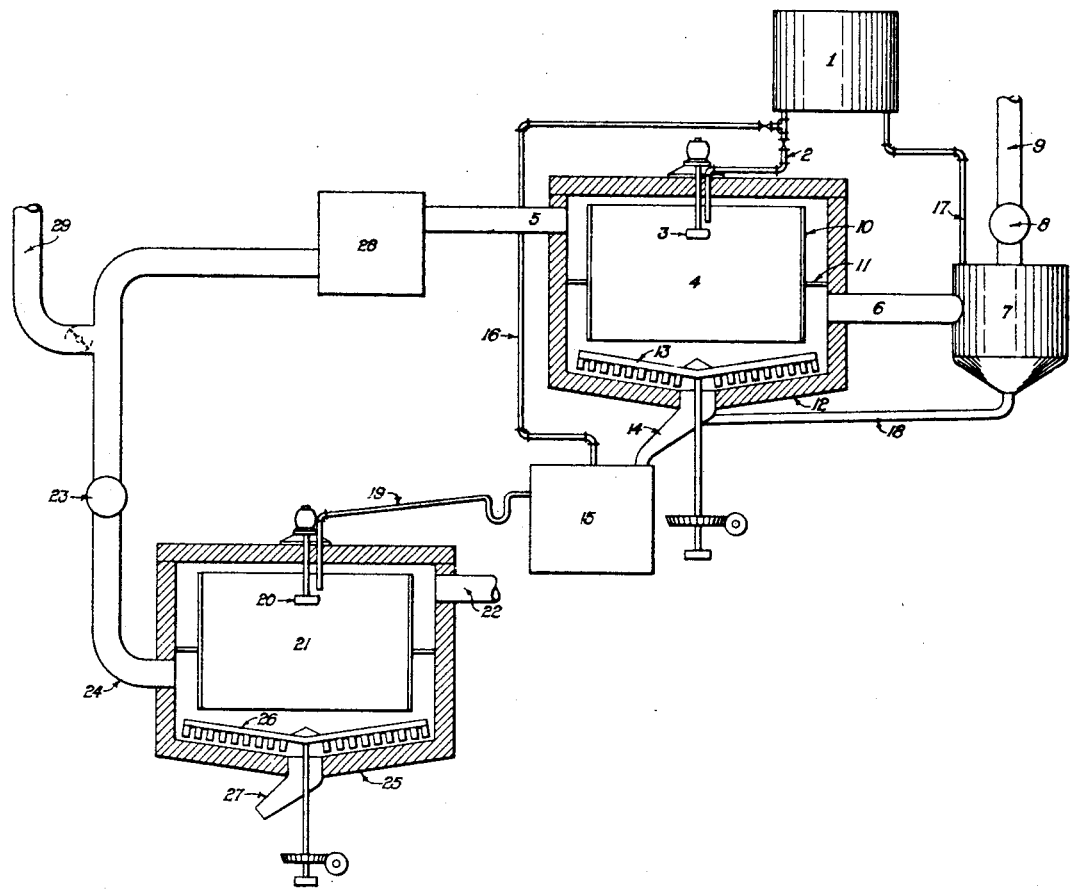

1,721,452

UNITED STATES PATENT OFFICE.

ARTHUR B. JONES, OF PLAINFIELD, NEW JERSEY, ASSIGNOR TO INDUSTRIAL ASSOCIATES, INCORPORATED, OF NEW YORK, N. Y., A CORPORATION OF NEW YORK.

METHOD OF OBTAINING HEAVY GRANULAR CONCENTRATES.

Application filed March 11, 1926. Serial No. 93,926.

My invention relates to new and improved method of obtaining heavy granular concentrates.

It has heretofore been common practice in the production of organic or inorganic chemicals in commercially dry form, to concentrate a weak solution in a vacuum pan or the like, followed by chilling or crystallization of the concentrate to reduce it to solid form, followed by removal of the crystals from crystallizing pans, or the breaking and grinding of the solidified cake. This method of procedure is not only relatively slow, but requires the use of a large amount of apparatus and relatively heavy labor costs.

According to the present invention the production of the commercial product is not only simplified and rendered substantially automatic, but is far more expeditious and economical. The thought which underlies my improved method comprises successive spray treatments by which the commercial product is directly obtained. More specifically the process contemplates one or more spray drying steps by which light solids are obtained from the weak solution, the solids thus obtained being brought into fluid form and again sprayed under conditions such that a heavy and uniform granular product is recovered which is appropriate for commercial purposes. This method does away with evaporation apparatus, solidifying tanks, or crystallizers, the breaking and grinding machinery, and greatly reduces the personnel requisite for supervision. Moreover, the granules produced by my method are of substantially uniform size; whereas a ground or crystallized product is a mixture of coarse and fine particles, which must be separated and the undesired portion worked over to the market size. By my method the size of the particles may be definitely determined by the size of the spray particles, and will be substantially uniform for the determined conditions, which may of course be carried to meet market requirements for the particular product handled. By reason of this uniformity of size, my granular product may be more uniformly mixed with other solids. The time required for its solution under given conditions may also be more accurately and reliably determined. For handling, shipment and storage purposes my heavy granular product is a decided advantage.

In the accompanying drawing, I have illustrated diagrammatically a simple layout for the practice of my invention.

It will be understood that the method is applicable to various final products, and that the layout and procedure may require modifications, depending upon the final product. For illustrative purposes, however, I will assume that the final product is sulphate of aluminum.

Referring to the drawing, I have illustrated any suitable supply source, such as a tank 1 containing a weak solution of aluminum sulphate. From this tank leads a pipe 2 which delivers the solution to a nebulizer 3, preferably of the centrifugal type, arranged in a spray drying chamber 4. A current of hot gas is introduced into the upper portion of the chamber through inlet 5 and is drawn off from the lower portion of the chamber at 6 to the dust extractor 7 and thence past fan 8 to the stack 9. A cylindrical baffle 10 may be arranged in the drying chamber, the hot gas entering above the diaphragm 11 and escaping from the chamber below the baffle 10 and diaphragm 11.

The light, flaky powder deposit at the bottom 12 of the drying chamber is too bulky for commercial purposes. It is delivered by a continuously operating rake 13 to the discharge chute 14 which empties into a liquefier 15. Here the powder is liquefied in any suitable manner, for example by a portion of the hot weak solution conveyed to the liquefier through a pipe 16 branched from pipe 2 and by-passing the drying chamber 4, or by the solution drawn from tank 1 and delivered to the dust extractor 7 through pipe 17 and thence by pipe 18 to the chute 14, where it simultaneously dissolves and washes down solids from drying chamber 4. The hot concentrate flows from the liquefier 15 through pipe 19 to a second spray device 20, also preferably of the centrifugal type, arranged in a second chamber 21 having a general construction similar to the drying chamber 4. Inasmuch as the hot concentrate solidifies upon chilling, the operation in the chamber 21 is not so much a drying operation as merely a solidifying operation. A current of gas at a temperature appropriate to effect solidification of the spray is introduced into the chamber 21 through inlet port 22 by means of a suction fan 23 arranged in the outlet pipe 24. The concentrate now in heavy granular form falls upon the floor 25 of the chamber, and is swept by a scraper 26 into chute 27 which delivers to storage bin or shipping containers. The gas from fan 23 may be passed through preheater 28 to intake port 5 of drying chamber 4. But if preferred, the air to preheater 28 may be taken wholly or partially through pipe 29.

It may well be that the quantity of light powder produced in drying chamber 4 is not sufficient to provide enough concentrate to feed the spray device 20 of the chilling or granulating chamber, if the capacity of the sprayer 20 is equal to that of the sprayer 3. Therefore it is desirable either that the output capacity of the drying chamber 4 exceed the output capacity of the chamber 21, or that a plurality of drying chambers 4 feed their discharge simultaneously to the liquefier 15. Or again, it may be desired to operate the chamber 4 as a spray drier for the weak solution, gathering the low specific gravity product in a hopper, thereafter to be converted into a hot concentrate and returned to the same chamber 4 operating now as a chilling and granulating chamber. I prefer, however, to provide a plurality of spray chambers and to operate certain of these for the production of the light, flaky powder, and another unit for the production of the final heavy granular product. In some instances it is practically necessary to spray dry more than once in order to obtain the light fluffy product which on liquefaction and final spray operation yields a granulated product sufficiently heavy for commercial purposes.

While I have referred to the spray units 3 and 20 as of the centrifugal type in view of the fact that they are in my judgment most suitable for carrying out the process, this type of apparatus is not essential. Any suitable form of spray device may be employed.

As above stated, the conditions which obtain in carrying out the method will vary with the liquor treated. For sulphate of aluminum the melting point of which is 230° F., the temperature at the liquefier 15 should be slightly above this in order to avoid danger of solidification of the liquid before its delivery to the spray device 20. Temperatures of fluid and gas are regulated to meet the requirements of the final product.

The leads 16 and 18 to the liquefier 15 may be dispensed with in some instances, and the light solids from drying chamber 4 liquified merely by heat. An anhydrous heavy granular product may thus be readily obtained from chamber 21, especially if the gas entering at 22 be heated. Heating of the gas supply for either or both of the chambers 4 and 21 is contemplated where the materials treated and the final product make this practice desirable.

The thought which underlies the invention as stated above, is the spray drying of solids out of an original weak solution, followed by the liquefaction of the solids, at appropriate temperatures, and either by heat alone or by admixture with a solvent, the fluid concentrate thus obtained by either step being sprayed under appropriate conditions to obtain a heavy granular commercial product of great uniformity. Preferably the layout is such as to carry the steps forward as a continuous process, but where conditions are not favorable to such operation the invention contemplates a non-continuous process in which the steps are successively carried out.

I claim as my invention—

1. The method of obtaining heavy granular solids from weak solutions thereof, which comprises spray drying the weak solution to obtain light solids, liquefying the solids so obtained, and dispersing the liquefied solids in a solidifying atmosphere.

2. The method of obtaining heavy granular solids from weak solutions thereof, which comprises spray drying the weak solution in a current of hot gas to obtain light solids, liquefying the solids so obtained and dispersing the liquefied solids in a solidifying atmosphere.

3. The method of obtaining heavy granular solids from weak solutions thereof, which comprises spray drying the weak solution in a current of hot gas to obtain light solids, liquefying the solids so obtained and dispersing the liquefied solids in a current of gas having a temperature below that at which the liquid solidifies.

4. The method of obtaining heavy granular solids from weak solutions thereof, which comprises spray drying a flowing stream of the weak solution to obtain light solids, continuously delivering the solids as formed to a liquefier and continuously dispersing liquid therefrom in a solidifying atmosphere.

5. The method of obtaining heavy granular solids from weak solutions thereof, which comprises centrifugally dispersing the weak solution in a current of hot gas to obtain light solids, liquefying the solids so obtained and centrifugally dispersing this liquid in a solidifying atmosphere.

6. The method of obtaining heavy granular solids from weak solutions thereof, which comprises spray drying the weak solution to obtain light solids, mingling said light solids with a liquid to produce a mass capable of dispersal, and dispersing said mass in a solidifying atmosphere to recover the solids in heavy granular form.

In testimony whereof I have signed my name to this specification.

ARTHUR B. JONES.